May 29, 1934.  R. K. STRATFORD  1,960,461

PROCESS FOR TREATING MINERAL OILS

Filed March 13, 1930

INVENTOR
Reginald K. Stratford
BY
W. E. Currie
ATTORNEY

Patented May 29, 1934

1,960,461

UNITED STATES PATENT OFFICE 1,960,461

PROCESS FOR TREATING MINERAL OILS

Reginald K. Stratford, Sarnia, Ontario, Canada, assignor to Standard Oil Development Company, a corporation of Delaware Application March 13, 1930, Serial No. 435,385

5 Claims. (Cl. 196—13)

This invention relates to an improved process for treating mineral oils to remove undesirable constituents therefrom.

Figure 1:
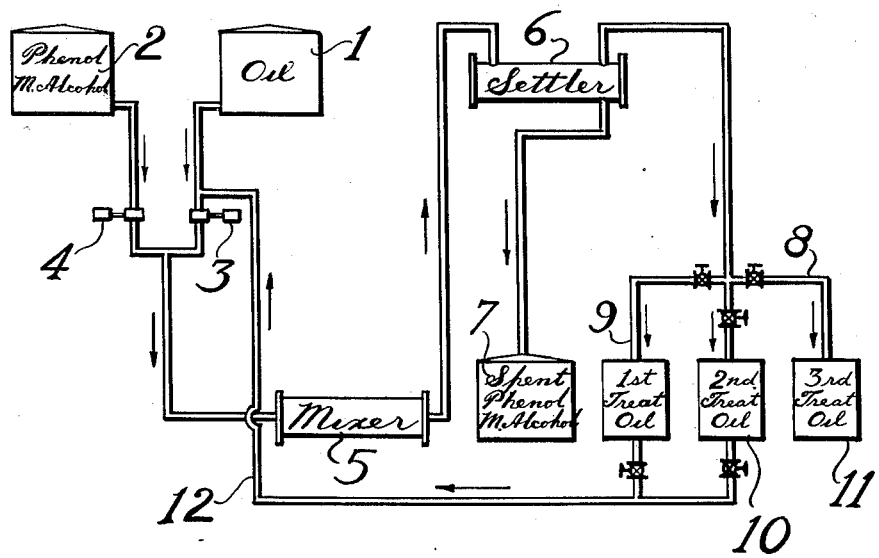
Figure 2:
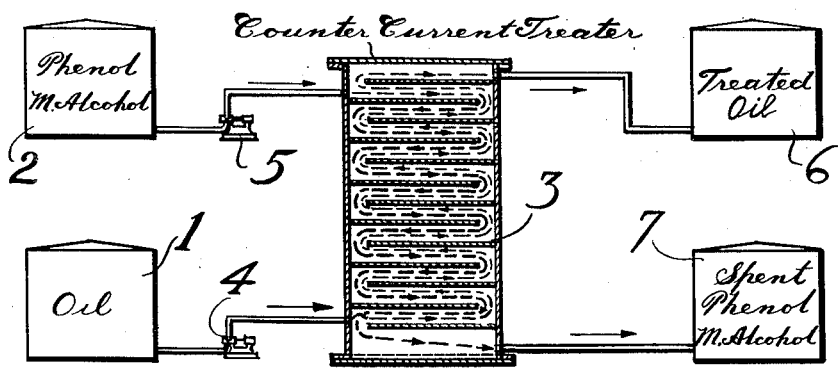

The invention will be fully understood from the following description in conjunction with the drawing, in which Fig. 1 shows a batch treater, and
Fig. 2 a counter-current treater.

Both figures represent a diagrammatic elevation of the apparatus shown.

The present process is applicable to treatment of mineral oils such as kerosene, light and heavy lubricating oils, and the like. I have found that such oils are much improved by treatment with a selective solvent, comprising phenol admixed with methyl alcohol. Small quantities of water may also be added to the treating agent, although usually better results are obtained by mixture of anhydrous phenol and methyl alcohol. The proportions of these treating agents may be varied somewhat but in general the proportion of phenol should vary between 65 and 95 per cent of the treating mixture.

The treating consists in agitating the oil with the phenol-methyl alcohol mixture, settling, and separating the purified oil layer from the phenol-methyl alcohol layer containing the absorbed constituents. It may be carried out either as a batch operation or as a semi-continuous operation in any appropriate apparatus; the batch and the counter-current treater of the drawing are only shown by way of illustration. The process and the apparatus will be conjointly described.

In Fig. 1 the oil and the phenol-methyl alcohol mixture from storage tanks 1 and 2 are passed by means of pumps 3 and 4 respectively through a mixer 5 into a settler 6. From the latter the spent phenol-methyl alcohol flows into tank 7 and the treated oil flows through manifold 8 into run-down tank 9. From the latter the oil is returned through line 12 to the treating cycle, passing the twice-treated oil into tank 10. The oil from tank 10 may be again returned to the treating cycle and the three times treated oil passed into run-down tank 11. If necessary, more than three run-down tanks can be provided for.

In Fig. 2 the oil from tank 1 and the treating mixture from tank 2 are passed through the counter-current treater 3 by means of pumps 4 and 5 respectively. In the treater, which may consist of several compartments, the oil and the treating agent are passed through the compartments, as indicated by arrows, according to the principle of counter-current treatment. The treated oil then is stored in tank 6 and the spent treating agent in tank 7.

The oil may be agitated with the phenol-methyl alcohol mixture in the batch treater for a certain length of time, for example, half an hour, and allowed to settle for approximately the same length of time. The time of agitating and settling will depend on the treating temperature and the viscosity of the oil treated, lower temperatures and higher viscosities making a longer treating time necessary. The oil may be given several batch treats in succession.

In the counter-current treatment the phenol-methyl alcohol mixture containing the absorbed constituents is gradually brought into contact with oil which obtained less partial treats.

The amount of treating agent used in one batch or one counter-current treat may vary within considerable limits, say from 50% to 300% of the volume of oil. In many cases the proportion of 100 bbls. of treating agent to 100 bbls. of oil in a counter-current treater was found to be advantageous.

The treated oil usually contains 5–20% of the treating agent which can be separated from the oil by distillation in the case when heavy high boiling oil is treated. The treating agent may be separated from light oils such as kerosene by washing with an aqueous alkaline solution or with an aqueous solution of an alkali metal phenolate. The latter process is described in U.S. patent application Serial No. 338,420, filed February 8, 1929, in the names of Stratford and Moor.

The treating agent may be separated from the extracted oil by various other methods. If the oil treated is a heavy high boiling oil, it is generally preferable to distil the treating agent therefrom, and vacuum distillation may be used. With light oil, such as kerosene, it is generally preferable to wash with low boiling naphtha so as to remove the kerosene from the solvent mixture and subsequently separate the naphtha from both the kerosene and the solvent mixture by distillation and rectification. This process of separation has been described in my prior application Serial No. 279,602, filed May 21, 1928.

The treating temperature may vary considerably. It should be kept safely above the melting point of the treating mixture but should not be so high as to make the treating mixture completely miscible with the oil. I have found that the melting points of phenol-methyl mixtures of varying concentration are about the following:

85% phenol 15% methyl alcohol mixture has a melting point of 57° F.,
90% phenol 10% methyl alcohol mixture has a melting point of 72° F.,
95% phenol 5% methyl alcohol mixture has a melting point of 87° F.

The treating temperature has a great influence on the raffinate yield and the improvement obtained. Higher treating temperatures cause a greater improvement but at the same time reduce the yield. Heavier oils require higher treating temperature than lighter oils.

In the treatment of kerosene the improvement may be noticed in the color, in the sulfur content and burning quality. The last improvement, which is very important, is adequately measured by the increased gravity after the treatment since a higher gravity oil has better burning qualities than a lower gravity oil of the same distillation range. The following example will illustrate the appication of my process to the treatment of kerosene.

Before treatment the kerosene has the following composition:

Gravity _____ 41.7° A. P. I.
Viscosity _____ 400 seconds on the Ubbelohde (viscosimeter at 60° F.)
Sulfur content ____ 0.130%

After treating the kerosene with 100% of treating agent consisting of 85% of phenol and 15% of methyl alcohol in batch treater at 60° F. and separating the oil layer the latter is found to contain 9.2% of phenol. Removing the phenol by lye wash 65% of raffinate yield is obtained having the following characteristics:

Gravity _____ 43.7° A. P. I.
Viscosity _____ 400 seconds on the Ubbelohde (viscosimeter at 60° F.)
Sulfur content ____ 0.063%

A similar treat in the 7-compartment counter-current treater, using half the amount of treating agent, gives 70% raffinate yield and a gravity of 44.2° A. P. I.

When lubricating oils are treated their viscosity is lowered. It is, however, characteristic that the viscosity at 100° F. is lowered in a larger proportion than the viscosity at 210° F. so that the ratio of the viscosity at 210° F. to the viscosity at 100° F. is always increased by the treatment. Since a high value of this ratio is a characteristic of good lubricating oils, such as Pennsylvania lubricants, it is evident that the phenol treatment improves the lubricating quality of the oil. A practical method of expressing the quality of lubricating oils numerically by the so-called "viscosity index", which is a function of the viscosities at 100° F. and 210° F., has been developed by E. W. Dean and G. H. B. Davis (Chemical and Metallurgical Engineering, vol. 36, 1929, page 618).

This method will be adopted in the example following hereinafter. The gravity of the oil is similarly increased, which a gain is an indication of better lubricating oil. A further improvement is to be noticed in a considerable reduction of sulfur content. In general, it may be said that low-grade lubricating oils are transformed by the treatement of this invention into Pennsylvania grade lubricants or at least they are improved in that direction.

The following example will illustrate the improvement of lubricating oils by the treatment. The oil treated is a heavy Colombian vacuum distillate having the following characteristics:

Gravity _____ 20.6° A. P. I.
Viscosity at 210° F., $v_1$ ___ 91 seconds Saybolt
Viscosity at 100° F., $v_2$ ___ 1900 seconds Saybolt
Viscosity index _____ 24
Sulfur _____ 0.83%

After treatment at 100° F. with an equal amount of a treating agent consisting of 85% of phenol and 15% of methyl alcohol in a 7-compartment counter-current treater, and separating the oil layer, the latter has 8% of the treating agent dissolved. After a lye wash 73% of raffinate yield is obtained having the following characteristics:

Gravity _____ 24.9° A. P. I.
Viscosity at 210° F., $v_1$ ___ 77.5 seconds Saybolt
Viscosity at 100° F., $v_2$ ___ 1,042 seconds Saybolt
Viscosity index _____ 61
Sulfur content _____ 0.49%

My method is not to be limited by any theory of chemical or physical action of the solvent, nor by any example given merely for the purpose of illustration but only by the following claims in which I wish to claim all novelty inherent in the process.

I claim:

1. An improved process for treating mineral oil, comprising agitating the same with a liquid solvent comprising phenol and methyl alcohol below the temperature at which the liquid solvent becomes completely miscible with the liquid oil, separating the oil layer from the solvent layer, and removing the dissolved solvent from the oil layer.

2. Process according to claim 1 in which the solvent contains about 65–95% of phenol.

3. Process for treating kerosene to improve its burning quality, comprising agitating the kerosene with a liquid solvent consisting of phenol and methyl alcohol below the temperature at which the liquid solvent becomes completely miscible with the kerosene, separating the residual kerosene layer from the solvent layer, and removing the dissolved solvent from the kerosene layer.

4. Process according to claim 3 in which the solvent contains about 65–95% of phenol.

5. Process according to claim 3 in which the kerosene is treated with about equal volume of the liquid solvent.

REGINALD K. STRATFORD.